(12) United States Patent
Johann

(10) Patent No.: US 7,484,937 B2
(45) Date of Patent: Feb. 3, 2009

(54) COMPRESSOR BLADE WITH REDUCED AERODYNAMIC BLADE EXCITATION

(75) Inventor: Erik Johann, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 10/870,437

(22) Filed: Jun. 18, 2004

(65) Prior Publication Data
US 2005/0271513 A1   Dec. 8, 2005

(30) Foreign Application Priority Data
Jun. 2, 2004   (EP) .................... 04090215

(51) Int. Cl.
F01D 5/14   (2006.01)
(52) U.S. Cl. ................ 416/228; 416/235; 416/243
(58) Field of Classification Search ........... 416/228, 416/235, 236 R
See application file for complete search history.

(56) References Cited

U.S. PATENT DOCUMENTS

| | | | |
|---|---|---|---|
| 1,903,823 A | 4/1933 | Lougheed | |
| 3,304,056 A | 2/1967 | Sohma | |
| 3,365,126 A * | 1/1968 | Stoffer et al. | 416/228 |
| 3,403,893 A * | 10/1968 | Stoffer | 416/228 |
| 3,578,264 A | 5/1971 | Kuethe | |
| 5,069,043 A | 12/1991 | Wachs, III et al. | |
| 5,169,290 A | 12/1992 | Chou | |
| 5,209,644 A * | 5/1993 | Dorman | 416/235 |
| 5,313,700 A | 5/1994 | Dorman | |
| 5,540,406 A | 7/1996 | Occhipinti | |
| 6,139,258 A * | 10/2000 | Lang et al. | 415/116 |
| 6,183,197 B1 | 2/2001 | Bunker et al. | |
| 6,264,429 B1 | 7/2001 | Koeller et al. | |
| 6,358,003 B2 * | 3/2002 | Schlechtriem | 415/181 |
| 6,358,012 B1 * | 3/2002 | Staubach | 416/228 |
| 6,416,289 B1 | 7/2002 | Ramesh et al. | |
| 6,538,887 B2 | 3/2003 | Belady et al. | |

(Continued)

FOREIGN PATENT DOCUMENTS

DE   10054244   6/2002

(Continued)

OTHER PUBLICATIONS

European Search Report dated Aug. 25, 2004.

(Continued)

*Primary Examiner*—Ninh H Nguyen
(74) *Attorney, Agent, or Firm*—Timothy J. Klima

(57) ABSTRACT

The compressor blades of an aircraft engine are, in at least one natural-vibration critical area, designed such that at the blade leading edge (6), the leading edge shock wave (14) attaches to the leading edge (6), as a result of which a laminar boundary layer flow (7) on the suction side (13) quickly transitions into a turbulent boundary layer flow (9) which is kept constant and prevented from re-lamination by the further, continuous curvature of the suction side. Therefore, the transition, whose periodic movement is also suppressed, cannot communicate with a suction-side compression shock (10), preventing the compression shock from augmenting the natural vibrations of the blade occurring under certain flight conditions. The blade leading edge can, for example, be designed as an ellipse with a semi-axis ratio equal to or smaller than 1:4.

11 Claims, 4 Drawing Sheets

U.S. PATENT DOCUMENTS 6,638,021 B2    10/2003   Olhofer et al.

FOREIGN PATENT DOCUMENTS

| EP | 0937862 | 8/1999 |
| EP | 0954701 | 11/1999 |
| EP | 1081332 | 3/2001 |
| GB | 347138 | 4/1931 |
| GB | 750305 | 6/1956 |
| GB | 2032048 | 4/1980 |
| WO | 98/22711 | 5/1998 |

OTHER PUBLICATIONS

European Search Report dated Sep. 17, 2004.

* cited by examiner

COMPRESSOR BLADE WITH REDUCED AERODYNAMIC BLADE EXCITATION

This application claims priority to European Patent Application EP 04090215.7 filed Jun. 2, 2004, the entirety of which is incorporated by reference herein.

BACKGROUND OF THE INVENTION

This invention relates to a compressor blade with reduced aerodynamic blade excitation, in particular for the fan of aircraft engines.

Compressor blades with a large chord length used on certain types of aircraft-engine compressors are loaded to such an extent under certain operating conditions that damage to or life reduction of the compressor blade and the compressor disk may occur.

In order to reduce the stressing of the compressor blades, the assignee of the present application has previously filed a U.S. patent application on Apr. 5, 2004, to Erik Johann, entitled "COMPRESSOR FOR AN AIRCRAFT ENGINE", in which it was disclosed to provide a flow transition fixation means in the form of a surface roughness applied to the suction side of the blade at a certain distance from and parallel to the blade leading edge and clearly ahead of the area of the compression shocks acting upon the blade. The local fixation of the transition area away from the compression shock area suppresses, or at least limits, coupling of the interrelated oscillation in the transition and compression shock area and, ultimately, avoids oscillation of the compression shocks or limits them to such an extent that their vibration-augmenting reaction on the natural vibrations of the compressor blade occurring under certain flight conditions, which eventually may lead to damage of the compressor blades and the compressor disk, is prevented.

BRIEF SUMMARY OF THE INVENTION

A broad aspect of this invention is to provide a design of compressor blades such that, independently of the already suggested fixation of the flow transition point by applying a surface roughness to the suction side, oscillation of the compression shocks (suction side) and their vibration-augmenting coupling to the natural vibrations of the blade is avoided or reduced, in order to avoid damage to the compressor disks and blades occurring under certain operating conditions.

It is a particular object of the present invention to provide solution to the above problems by a compressor blade designed in accordance with the features described herein. Further variants and—if combined—advantageous embodiments of the present invention will become apparent from the description below.

The essence of this invention is the particular design of the blade leading edge such that the leading edge shock wave effective there will not detach from, but rather attach to the leading edge to effect the transition from the laminar to the turbulent boundary layer flow at a short distance from the leading edge without accelerating it along the continuous curvature of the suction side starting at the leading edge, thus keeping the boundary layer flow constant without re-lamination. Accordingly, the transition point, whose periodic movement is largely suppressed and which is sufficiently remote of the compression shock on the suction side, can neither communicate with nor have a vibration-augmenting effect on the latter. Thus, reaction of the vibrations of the compression shock onto the critical natural vibrations occurring under certain flight conditions is suppressed or at least limited to such an extent that the natural vibrations are not augmented, or are not augmented to such an extent that overstressing in excess of the strength limits, with consequential material damage to the compressor blades and/or the compressor disk, occurs.

The shape of the blade leading edge can, for example, be a very slender ellipse or parabola—with an ellipse ratio of the semi-minor axis to the semi-major axis smaller than or equal to 1:4—with the curvature extending continuously on the suction side. As a result of this design, the leading edge shock wave attaches to the leading edge, the initially laminar boundary flow quickly transforms, i.e. at a short distance from the blade leading edge, into a turbulent boundary flow without being accelerated and re-laminated, and the transition point is thus not moved periodically.

To achieve the above effects, the leading edge can, in the upper, natural-vibration critical area, also have a serrated structure, pocket-type depressions or a recessed area acting as sweep-back. Additionally, other designs of the blade leading edge are possible to ensure attachment of the leading edge shock wave to the blade leading edge and avoid acceleration and re-lamination of the turbulent boundary layer flow along the subsequent, suction-side curvature. Local disturbances in the boundary layer are produced which support the flow transition fixation.

In accordance with still another feature of the present invention, the suction side of a conventionally designed leading edge with detached leading edge shock wave can be provided with a reflex to effect a rapid transition and the stabilization of the turbulent boundary layer flow. It is, however, also imaginable to combine this curvature on the suction side with a leading edge structure which effects the attachment of the leading edge shock wave.

BRIEF DESCRIPTION OF THE DRAWINGS

The present invention is more fully described in light of the accompanying drawings showing a preferred embodiment. In the drawings.

DETAILED DESCRIPTION OF THE INVENTION

Figure 1:
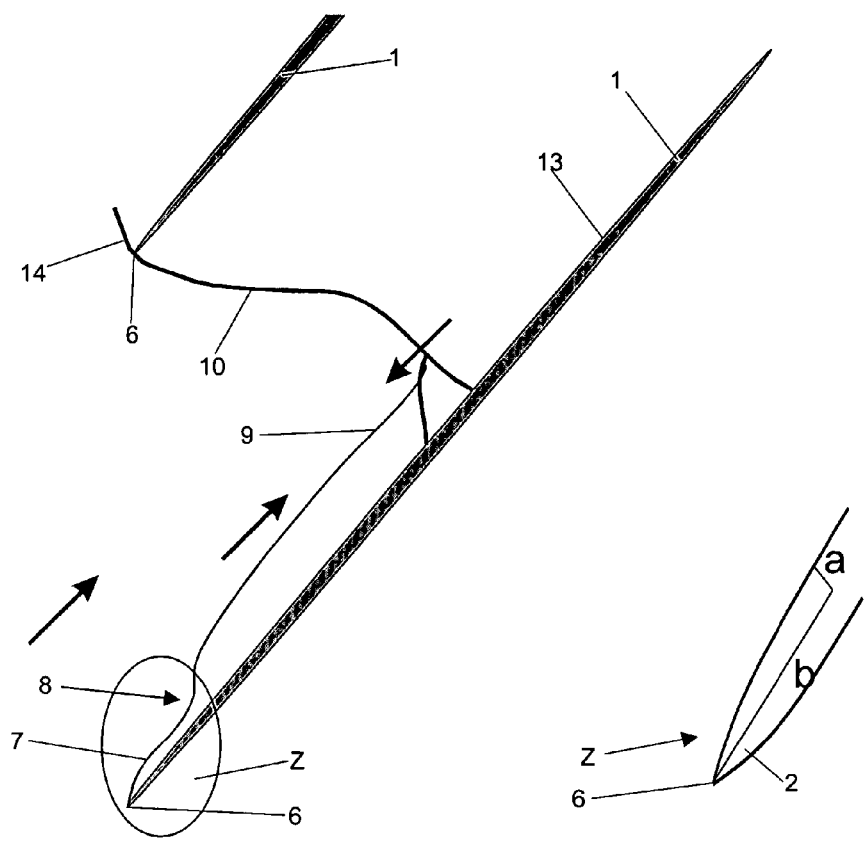
FIG. 1 is a sectional view of a compressor blade with modified leading edge in accordance with a first embodiment of the invention, including a graphical representation of the shock wave attaching to the leading edge of the compressor blade and of the compression shock acting on the suction side as well as the respective boundary layer flow.

The compressor blades 1 illustrated in FIGS. 1 to 4 feature in an upper area, in relation to the blade tip 12, a specific form (2 to 5) of the blade leading edge 6 by which, as shown in FIG. 1, attachment of the leading edge shock wave 14 immediately at the blade leading edge 6 and, consequently, the boundary layer flow on the suction side 13 of the compressor blade 1 shown in FIG. 1 is achieved in this blade area. This means that the situation shown in FIG. 1 applies similarly to the compressor blades 1 shown in FIGS. 2 to 4.

According to the blade variant shown in FIG. 1, the blade leading edge has an elliptic (or also a parabolic) cross-sectional profile 2, with the ratio of the two semi-axes a/b being smaller than or equal to 1/4. This means that the curvature radius of the leading edge is small and the blade thickness correspondingly low. The cross-section of the compressor blade 1 is continuously curved.

Figure 2:
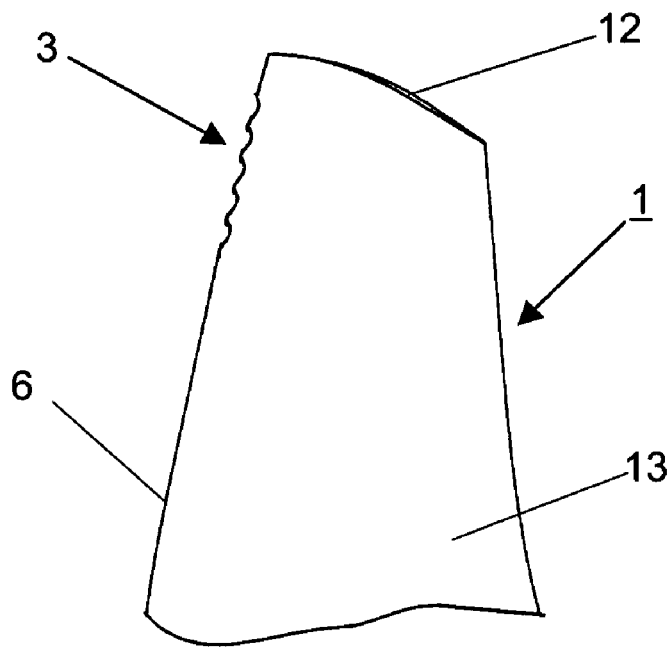
FIG. 2 is a side view of a part of a compressor blade, with the design of the leading edge differing from that of the blade shown in FIG. 1.

In the case of the blade variant according to FIG. 2, a serration 3 is provided in an upper area of the blade leading edge 6. Essentially, a boundary layer flow is here achieved which corresponds to that shown in FIG. 1.

Figure 3:
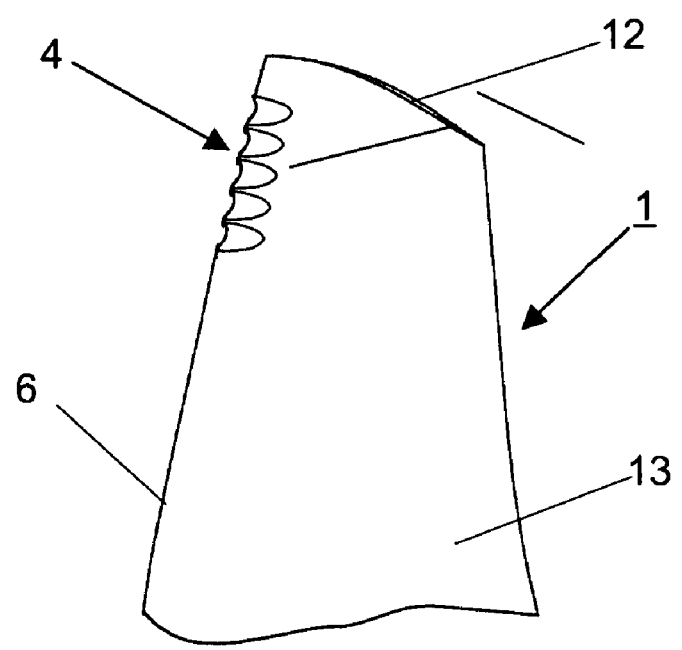
FIG. 3 is a side view of a part of the compressor blade shown in FIG. 2, however with modified design of the leading edge of the latter.

According to the third variant shown in FIG. 3, several adjacent, pocket-style recesses 4 are provided at the blade leading edge 6 in lieu of the serration which essentially have the same effect as the above mentioned serration or the blade leading edge 6 with the specified ellipse ratio.

Figure 4:
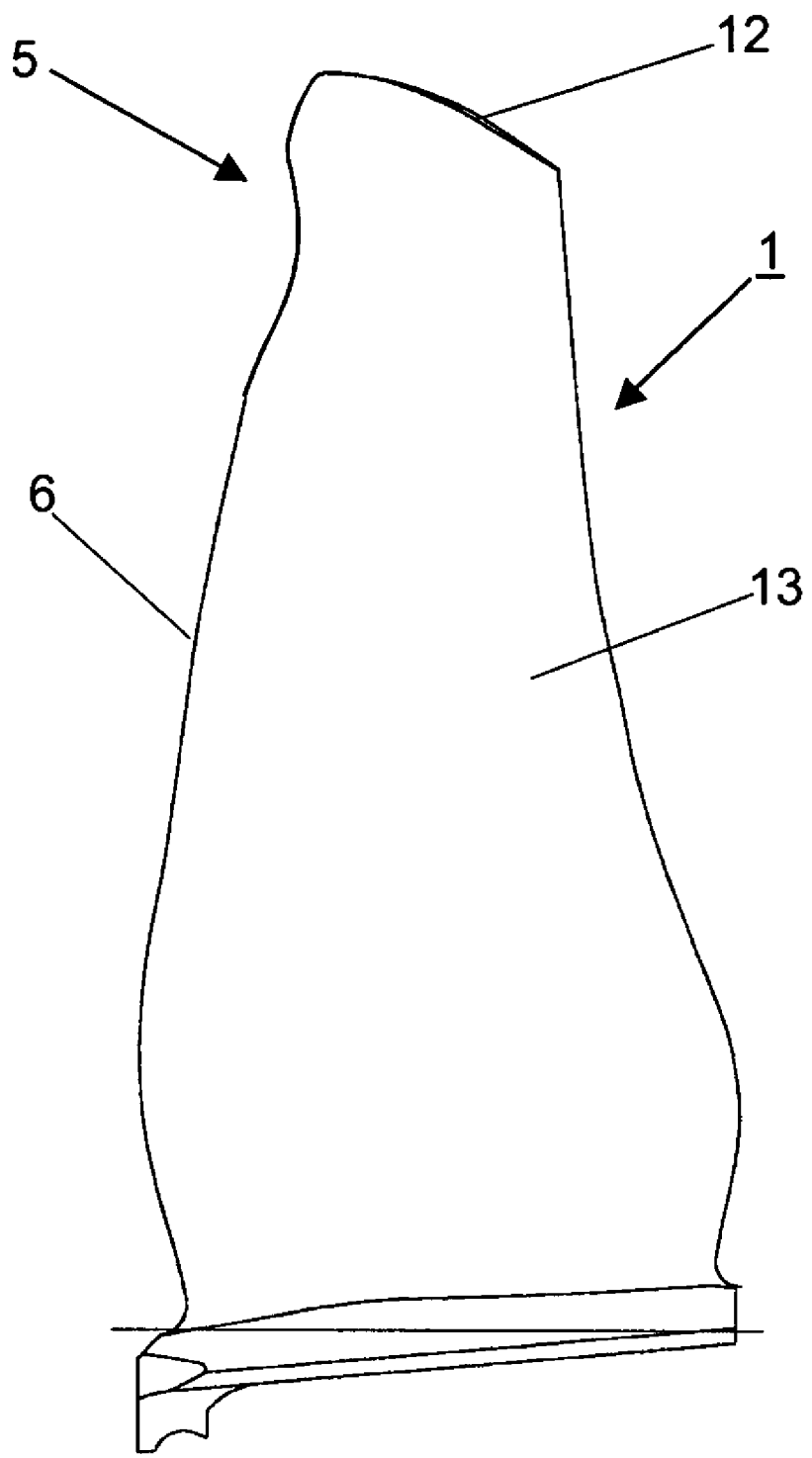
FIG. 4 is a side view of still another embodiment of a compressor blade according to the present invention.

Finally, FIG. 4 still shows another variant of a compressor blade 1 with the inventive design of the leading edge 6 which features, in the upper area, a recessed, curved section 5 to provide a leading edge sweepback. The resultant differences in incidence and the changed ratio between the incidence Mach number and the relative Mach number here again effect attachment of the shock wave to the blade leading edge 6 in the respective leading edge area.

Also with the blade designs according to FIGS. 2 to 4, the blade features a continuous, suction-side curvature and small thickness.

The design of the blade leading edge 6 in accordance with the variants 1 to 4 in combination with the attachment of the shock wave to the blade leading edge 6 results in the initially laminar boundary layer flow 7 changing into a turbulent boundary layer flow 9 at a transition point 8 located shortly downstream of the blade leading edge 6 and the flow is not accelerated beyond a certain degree, as a result of which the turbulent boundary layer flow 9 is not re-laminated, i.e. remains turbulent. Vibration of the transition point 8 is, therefore, low and its distance to the compression shock 10, which acts upon the suction side 13 of the compressor blade 1 and which is normally in the range of 45 to 70 percent of the blade width away from the leading edge 6, is large enough to avoid, or at least limit, a vibration-augmenting reaction on the suction-side compression shock 10. Since the compression shock 10 cannot communicate with the boundary layer flow 7, 9 or the prevented periodic movement of the transition point 8 of the boundary layer flow, respectively, oscillation of the compression shock is limited to such an extent that the coupling effect between the natural vibrations (second and third flexural, first torsional) occurring at the compressor blade 1 under certain conditions (Reynolds number, Mach number, Strouhal number) and the compression shock vibrations is suppressed and, thus, the natural vibrations are prevented from exceeding a magnitude which causes damage to the compressor blades and the compressor disk.

Figure 5:
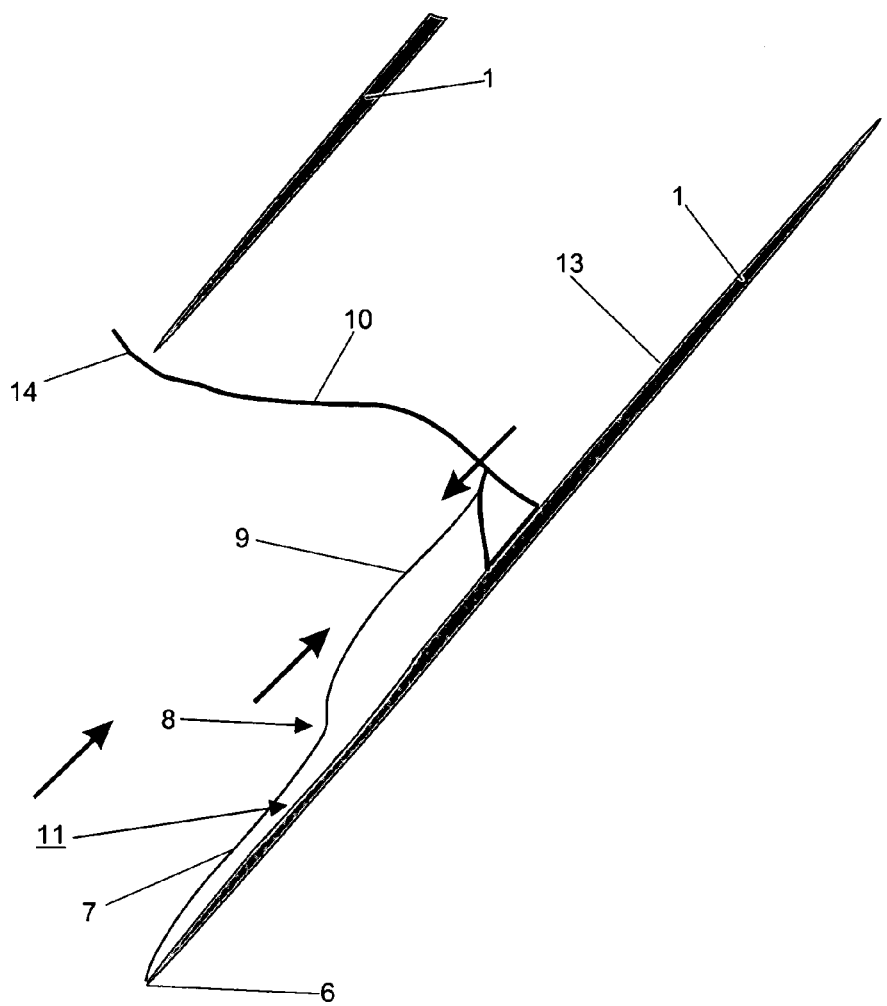
FIG. 5 is a sectional view of the compressor blade according to FIG. 1, however with discontinuous curvature and corresponding boundary layer flow on the suction side.

According to the variants shown in FIGS. 1 to 4, the compressor blade 1 with the respective, particular design of the blade leading edge 6 features a continuous curvature on the suction side 13 which extends from the leading edge. It is, however, also imaginable that the curvature on the suction side of the compressor blade 1, as shown in FIG. 5, is designed with a reflex, in which case a concave depression 11 is provided in the forward area of the compressor blade 1. In the depression 11, the pressure of the laminar boundary layer flow 7 along the suction side 13 is increased, as a result of which it transits into a turbulent boundary layer flow 9 at the transition point 8 so given. Here, acceleration at the end of the depression 11 is so low that the turbulent boundary layer flow 9 remains constant and instabilities ahead of it are dampened. Basically, in the case of the discontinuously curved suction side of the compressor blade 1 as per FIG. 5, the leading edge 6 can be designed conventionally, i.e. thicker or, respectively, with an ellipse ratio of a/b equal to 1/2, for example. Preferably, however, the discontinuously curved shape of the suction side can be used in combination with one of the variants illustrated in FIGS. 1 to 4 in order to even better stabilize the turbulent boundary layer flow and avoid re-lamination, thus preventing the transition point from moving periodically.

LIST OF REFERENCE NUMERALS 1 compressor blade
2 blade leading edge structure: elliptic
3 blade leading edge structure: serration
4 blade leading edge structure: pocket-style recesses
5 blade leading edge structure: recessed section
6 blade leading edge
7 laminar boundary layer flow
8 transition point
9 turbulent bounding layer flow
10 compression shock, suction-side shock
11 suction-side depression, reflex
12 blade tip
13 suction side
14 leading edge shock wave

What is claimed is:

1. A compressor blade for a gas turbine, comprising a suction and a pressure side and a blade leading and trailing edge the blade having a relatively long chord length, wherein the blade leading edge, at a blade tip area, operates at transonic and supersonic velocities, and, in at least one natural-vibration critical area, is structured such that a leading edge shock wave attaches to the blade leading edge, as a result of which an initially laminar boundary layer flow changes, at a transition point a short distance from the blade leading edge into a turbulent boundary layer flow which neither accelerates nor re-laminates within a continuous curvature extending from the blade leading edge on the suction side, thus suppressing a periodic movement of the transition point and preventing the transition point from communicating with a compression shock on the suction side;

wherein the blade leading edge is structured as one of an elliptic or parabolic cross-sectional profile having an ellipse ratio (a:b) being equal to or smaller than 1 to 4 to effect attachment of the leading edge shock wave immediately to the blade leading edge.

2. A compressor blade in accordance with claim 1, wherein the blade leading edge includes an area having a serration to effect attachment of the leading edge shock wave.

3. A compressor blade in accordance with claim 1, wherein the blade leading edge includes an area having pocket-style recesses to effect attachment of the leading edge shock wave.

4. A compressor blade in accordance with claim 1, wherein the blade leading edge includes a recessed area acting as a sweep-back to effect attachment of the leading edge shock wave.

5. A compressor blade in accordance with claim 4, wherein the recessed area includes a concave curvature.

6. A compressor blade in accordance with claim 1, wherein the suction side is designed as a reflex which includes a depression in an area of the laminar boundary layer flow on the suction side in order to effect, by pressure increase, a transition into the turbulent boundary layer flow and keep acceleration of the boundary layer flow low and the boundary layer flow itself constant.

7. A compressor blade for a gas turbine compressor, comprising a leading edge, which at a blade tip area, operates at transonic and supersonic velocities, and a suction side which includes a concave depression near the leading edge to cause transition of a boundary layer flow from laminar to turbulent, and keep acceleration of the boundary layer flow low and flow of the turbulent boundary layer constant; the depression being positioned on the suction side between the leading edge and a midpoint of the blade, the depression being shallow with gradually tapering leading and trailing edges and extending across a substantial portion of the distance from the leading edge to the blade midpoint, the depression positioned to begin between the leading edge and a midpoint between the leading edge and the blade midpoint and having a width several times its depth, the blade having a relatively long chord length.

8. A compressor blade for a gas turbine, comprising a leading edge and a suction side, the blade having a relatively long chord length, the blade leading edge, at a blade tip area, operating at transonic and supersonic velocities, and the blade leading edge including an area having pocket-style recesses to attach a leading edge shock wave to the leading edge, and to transition a suction side boundary layer flow from laminar to turbulent at a point a short distance from the leading edge, with the turbulent boundary layer flow neither accelerating nor re-laminating within a continuous curvature extending from the leading edge, thus suppressing a periodic movement of the transition point and preventing the transition point from communicating with a suction side compression shock, the pocket style recesses positioned so that a major portion thereof is positioned on the suction side of the blade adjacent the leading edge.

9. A compressor blade in accordance with claim 8, wherein the suction side is designed as a reflex which includes a depression in an area of the laminar boundary layer flow on the suction side in order to effect, by pressure increase, a transition into the turbulent boundary layer flow and keep acceleration of the boundary layer flow low and the boundary layer flow itself constant.

10. A compressor blade for a gas turbine, comprising a suction and a pressure side and a blade leading and trailing edge, the blade having a relatively long chord length, wherein the blade leading edge, at a blade tip area, operates at transonic and supersonic velocities, and, in at least one natural-vibration critical area, is structured such that a leading edge shock wave attaches to the blade leading edge, as a result of which an initially laminar boundary layer flow changes, at a transition point a short distance from the blade leading edge into a turbulent boundary layer flow which neither accelerates nor re-laminates within a continuous curvature extending from the blade leading edge on the suction side, thus suppressing a periodic movement of the transition point and preventing the transition point from communicating with a compression shock on the suction side;

wherein the blade leading edge includes a concavely curved recessed area acting as a sweep-back to effect attachment of the leading edge shock wave, the recessed area starting at a position radially inward from the blade tip and ending before a blade midpoint.

11. A compressor blade in accordance with claim 10, wherein the suction side is designed as a reflex which includes a depression in an area of the laminar boundary layer flow on the suction side in order to effect, by pressure increase, a transition into the turbulent boundary layer flow and keep acceleration of the boundary layer flow low and the boundary layer flow itself constant.

* * * * *